US009563920B2

(12) United States Patent
Lall

(10) Patent No.: US 9,563,920 B2
(45) Date of Patent: Feb. 7, 2017

(54) METHOD, SYSTEM AND PROGRAM PRODUCT FOR MATCHING OF TRANSACTION RECORDS

(71) Applicant: Tracey Deborah Lall, Astoria, NY (US)

(72) Inventor: Tracey Deborah Lall, Astoria, NY (US)

(73) Assignee: Operartis, LLC, Astoria, NY (US)

( * ) Notice: Subject to any disclaimer, the term of this patent is extended or adjusted under 35 U.S.C. 154(b) by 0 days.

(21) Appl. No.: 14/175,806

(22) Filed: Feb. 7, 2014

(65) Prior Publication Data
US 2014/0279304 A1 Sep. 18, 2014

Related U.S. Application Data

(60) Provisional application No. 61/785,875, filed on Mar. 14, 2013.

(51) Int. Cl.
G07B 17/00 (2006.01)
G07F 19/00 (2006.01)
G06Q 40/00 (2012.01)

(52) U.S. Cl.
CPC .................................. *G06Q 40/12* (2013.12)

(58) Field of Classification Search
None
See application file for complete search history.

(56) References Cited

U.S. PATENT DOCUMENTS

| 5,960,430 A | 9/1999 | Haimowitz et al. |
| 7,542,973 B2 | 6/2009 | Segal et al. |
| 2007/0271160 A1* | 11/2007 | Stone et al. ................ 705/30 |
| 2009/0006380 A1* | 1/2009 | Agrawal et al. .............. 707/5 |
| 2011/0004626 A1* | 1/2011 | Naeymi-Rad et al. ....... 707/776 |
| 2011/0137928 A1 | 6/2011 | Engle et al. |
| 2012/0197827 A1 | 8/2012 | Mineno |
| 2012/0221485 A1 | 8/2012 | Leidner et al. |

OTHER PUBLICATIONS

ISA/US, PCT International Search Report/Written Opinion, PCT/US14/22875; 2014-03014, Alexandria, VA.

* cited by examiner

*Primary Examiner* — Fateh M Obaid
(74) *Attorney, Agent, or Firm* — Foley & Lardner LLP; Daniel Rose

(57) ABSTRACT

A method, system and program product comprise accessing a transaction records database. Unmatched records are collected into a first set. The first set at least comprises events and transactions. Probabilities of event matches of transactions originating from an event are calculated. The calculating uses at least defined features and stored probability distributions. A quality value for each of the event matches is calculated. The quality value is at least in part being determined by the probability of the event match. A second set of optimized event matches is determined using at least the quality values. Each of the optimized event matches at least comprises transactions deemed to have been generated by the event.

32 Claims, 15 Drawing Sheets

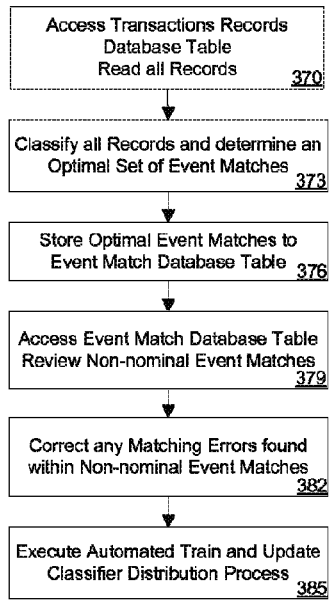
FIG. 3A
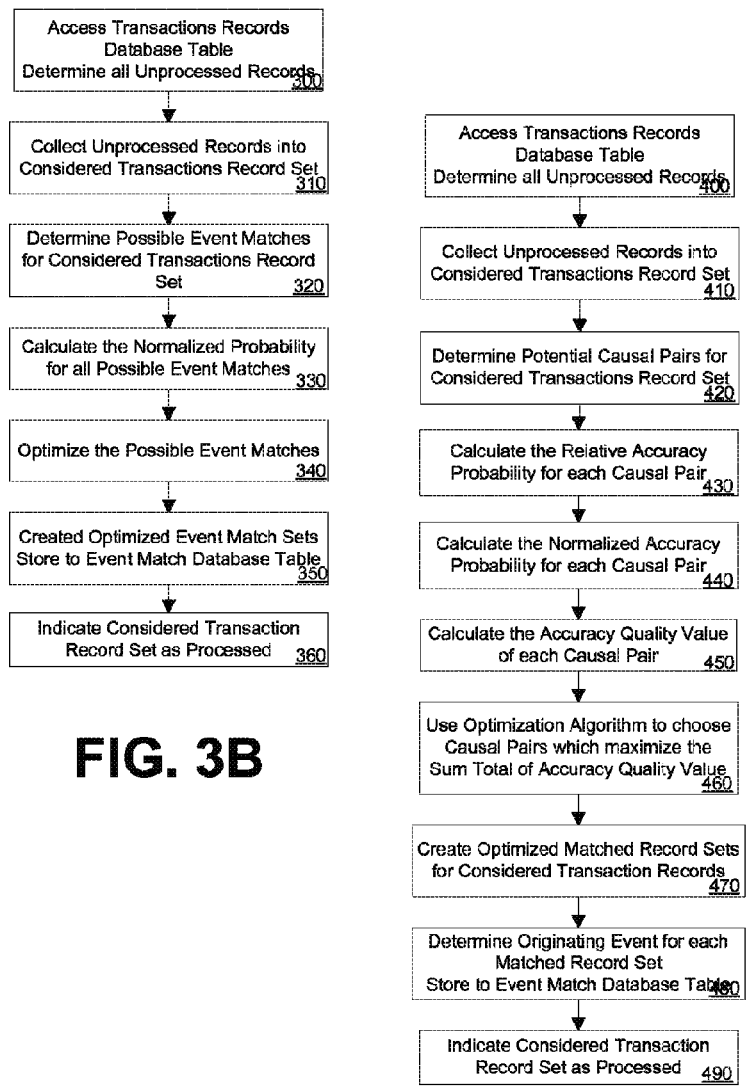
FIG. 3B
FIG. 4

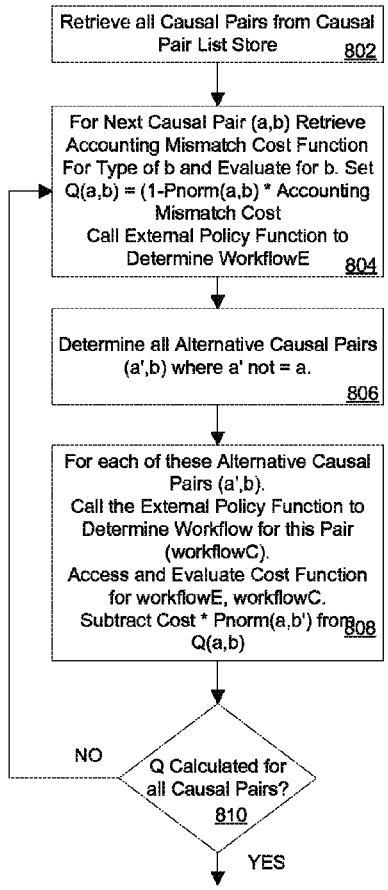
FIG. 8
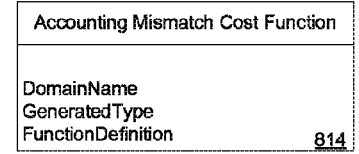
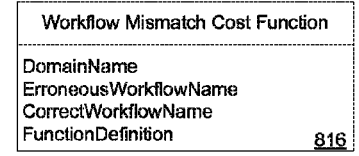
FIG. 8A
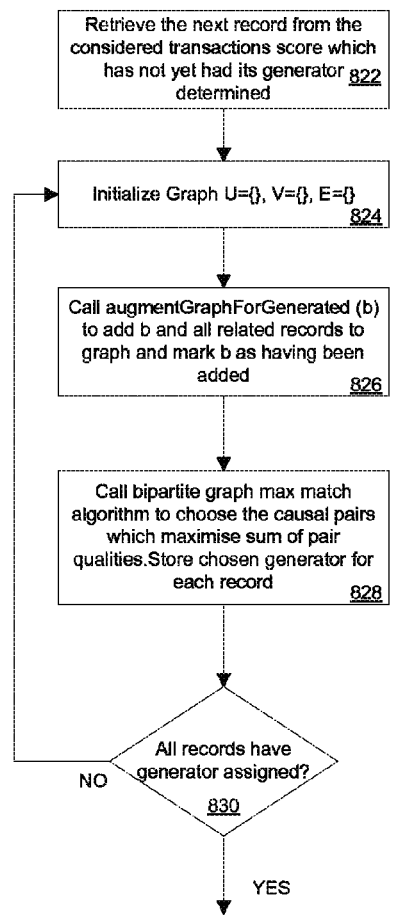
FIG. 8B

METHOD, SYSTEM AND PROGRAM PRODUCT FOR MATCHING OF TRANSACTION RECORDS

CROSS-REFERENCE TO RELATED APPLICATIONS

The present Utility patent application claims priority benefit of the [U.S. provisional application for patent Ser. No. 61/785,875, filed on Mar. 14, 2013 under 35 U.S.C. 119(e). The contents of this related provisional application are incorporated herein by reference for all purposes to the extent that such subject matter is not inconsistent herewith or limiting hereof

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to the automated matching of operational transaction records. More particularly, the invention generally relates to a method, apparatus and program for using information derived from validated historical transaction matches to enable the matching of new transactions such that the operational risk associated with any potential mismatches is minimized.

BACKGROUND OF THE INVENTION

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon.

By way of educational background, an aspect of the prior art generally useful to be aware of is that in many typical business and financial operational environments matches must be found between business transaction records drawn from two or more different data sources and which have originated from the same business event in order to reconcile said business event with said subsequently created business transaction records.

By way of educational background, an aspect of the prior art generally useful to be aware of is shown in FIG. 1A. FIG. 1A shows a flow chart of the typical business transaction records created due to the occurrence of an exemplary sales event. Referring to a Step 100, a customer order sales event occurs. In a Step 110, due to the occurrence of the sales event, the vendor creates an invoice record. In a Step 115, also due to the occurrence of the sales event, the vendor delivers the product and invoice to the customer. In a Step 135 the vendor posts the sale to the general ledger and, in a Step 140, the vendor creates a general ledger entry record. In a Step 120, also following the vendor delivering of the product and invoice to the customer, the customer receives the order and submits payment. In a Step 125 the vendor financial institution receives payment and records the deposit. In a Step 130, the financial institution creates a bank movement record.

By way of educational background, an aspect of the prior art generally useful to be aware of is shown in FIG. 1B. FIG. 1B shows a flow chart of the typical business transaction record created due to a vendor financial institution service event. In a Step 150 a vendor financial institution service event occurs. In a Step 155, due to the occurrence of the service event, the vendor financial institution records either a fee or a credit to the vendor financial institution account. In a Step 160 the vendor financial institution creates a bank movement record.

By way of educational background, an aspect of the prior art generally useful to be aware of is shown in FIG. 1C. FIG. 1C shows a flow chart of the typical business transaction record created due to a customer erroneous payment event. In step 170 a customer erroneous payment event occurs. In step 175, due to the occurrence of the erroneous payment event, the vendor financial institution records a credit to the vendor financial institution account. In step 180 the vendor financial institution creates a bank movement record.

By way of educational background, an aspect of the prior art generally useful to be aware of is shown in FIG. 2A. FIG. 2A shows a list of the fields ordinarily associated with an Invoice Record. These fields may consist of the saleDate field, the productId field, the quantity field, the billedAmount field, the orderId field, and the customerName field.

By way of educational background, an aspect of the prior art generally useful to be aware of is shown in FIG. 2B. FIG. 2B shows a list of the fields ordinarily associated with a General Ledger Entry Record. These fields may consist of the postDate field, the amount field, the customerId field and the salesDivision field.

By way of educational background, an aspect of the prior art generally useful to be aware of is shown in FIG. 2C. FIG. 2C shows a list of the fields ordinarily associated with a Bank Movement Record. These fields may consist of the custodianBank field, the valueDate field, the amount field, the orderingParty field and the sendersRef field.

By way of educational background, an aspect of the prior art generally useful to be aware of is that the General Ledger Entry Record postDate field may be related to the Invoice Record saleDate field, the Bank Movement Record orderingParty field may be related to the Invoice Record customerName field and may also be related to the General Ledger Entry Record customerId field, the General Ledger Entry Record amount field may be related to the Bank Movement Record amount field and may also be related to the Invoice Record billedAmount field.

By way of a non-limiting example, a product sales event may result in the subsequent origination of an invoice business transaction record, a general ledger entry business transaction record, and/or a bank statement business transaction record. Each business transaction record originating from said sales event will typically eventually be matched resulting in the pairing of the invoice record with the general ledger record and/or the bank movement record. Record matching is typically accomplished by examining the fields of the individual records for correlating information. It is customary for the base business transaction record type for a sales event to be the invoice business transaction record such that, for a typical occurrence of a particular sales event, the values of each of the fields of the invoice business transaction record will define the correct values of the corresponding fields of all subsequently generated business transaction records originating from that particular sales event. For any given domain these relationships constitute a set of causal relations which define the possible causal generators for each record type, where a causal generator is either an event type or another record type. By way of example for the example sales domain the possible causal generators for a bank movement are invoice, financial institution service event or a customer erroneous payment event.

By way of educational background, an aspect of the prior art generally useful to be aware of is that automated reconciliation systems exist which typically use a set of ordered matching rules to match records by comparing the fields of the transaction records.

By way of a non-limiting example, a matching rule might match an invoice record to a bank transaction record if said invoice record contains a billedAmount field value which is equal to the amount field value of said bank movement transaction record and, said invoice record contains an orderId field value which is equal to the sendersRef information field value contained in said bank transaction record.

By way of a non-limiting example, a matching rule may be defined by a user or may be predefined for a particular domain. Periodically, as the characteristics of the records change, the matching rules may be reviewed and updated by the user. Typically, for a given set of records, matching rules may be evaluated in sequential order and, as said records are matched, these matched record sets may then be removed from said given set of records. It is useful to be aware that, in some circumstances, it is possible for a first matched record set to be created for a particular set of records based on evaluation against a first matching rule, and a second matched record set to be created for said particular set of records based on evaluation against a second matching rule, in which said first and second matched record sets consist of some or all of the same records. However, as the records are evaluated against the matching rules in sequential order records that may have comprised said second matched record set are removed from said particular set of records, due to creation of said first matched record set, prior to evaluation against said second matching rule. Occasionally an erroneous match record set may be created due to an evaluated record satisfying an inappropriate matching rule. Usually these erroneously created matched record sets are identified and corrected manually.

Typically, the problems with rules based matching include the following:
The rules definitions must be created by the user or predefined for a particular domain problem.
As the characteristics of the data change, the rules must be reviewed and updated by the user.
There is no automated validation that the matches created by the rules are correct.
There is no automated validation that the rules include all potential match candidates which surpass a particular probability threshold.
There is no systematic assessment of the confidence or probability of each match.
The particular matches created depend on the order in which records match against the rules.
The matches are not optimized within the overall context of the total set of all potential matches for all records in the processing set.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

Unless otherwise indicated illustrations in the figures are not necessarily drawn to scale.

FIG. 1B shows a flow chart of a conventional business transaction record created due to a vendor financial institution service event;

FIG. 3A is a flowchart illustrating, at a high level, an exemplary operating cycle of the invention in accordance with an embodiment of the present invention;

FIG. 3B is a flowchart illustrating an exemplary general process for classifier event matching of operational transaction records in accordance with an embodiment of the present invention;

FIG. 4 is a flowchart illustrating an exemplary process for optimized matching of operational transaction records using a causal independence assumption to decompose each event match into a set of independent causal pair matches, in accordance with an embodiment of the present invention;

FIG. 8 is a flow chart illustrating an exemplary process for calculating the quality value for all causal pairs, in accordance with an embodiment of the present invention;

FIG. 8A shows the database tables which hold the cost functions used in the causal pair quality calculations, in accordance with an embodiment of the present invention;

FIG. 8B is a flow chart which shows the process for choosing the generating causal pair for each record such that the sum of the quality values is maximized, in accordance with an embodiment of the present invention;

DETAILED DESCRIPTION OF SOME EMBODIMENTS

Figure 1A:
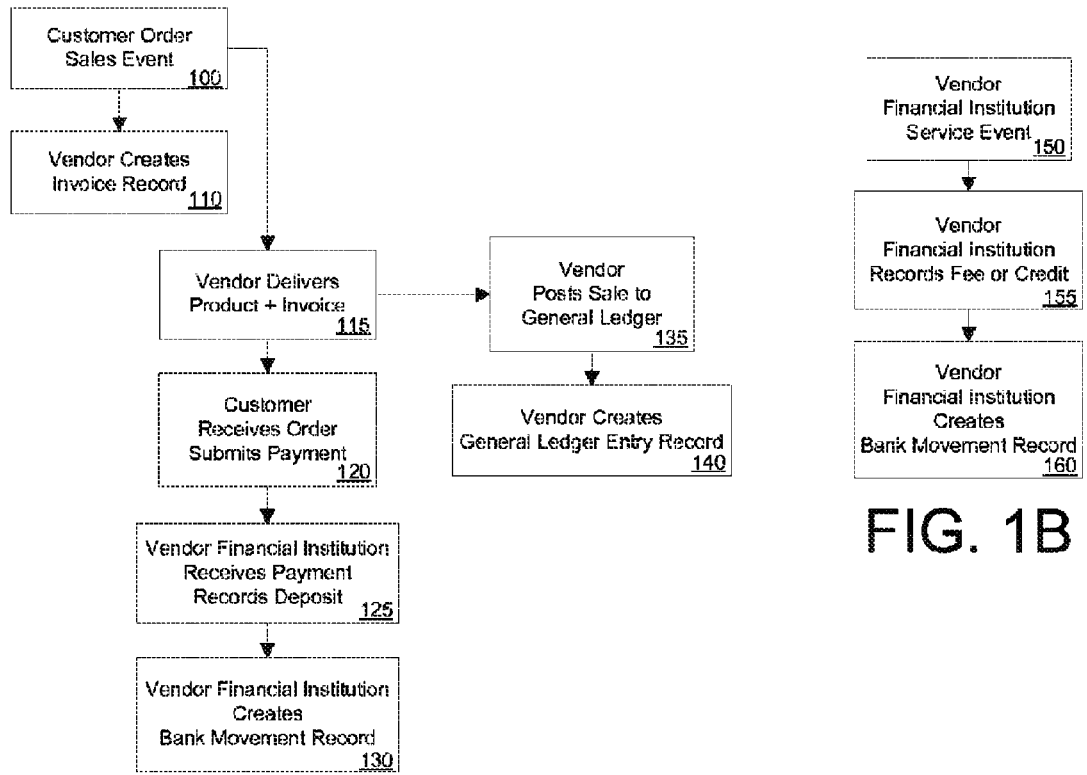
FIG. 1A shows a flow chart of conventional business transaction records created due to the occurrence of an exemplary sales event.
Figure 1C:
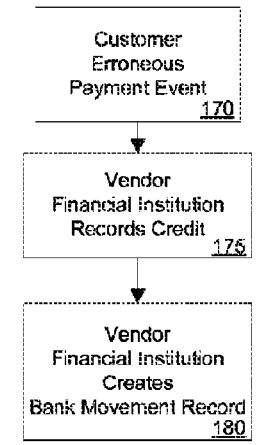
FIG. 1C illustrates a flow chart of a conventional business transaction record created due to a customer erroneous payment event.
Figure 2A:
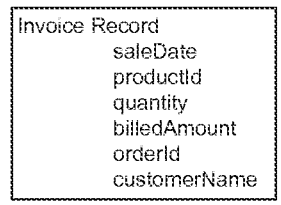
FIG. 2A illustrates a conventional list of the fields ordinarily associated with an exemplary Invoice Record.
Figure 2B:
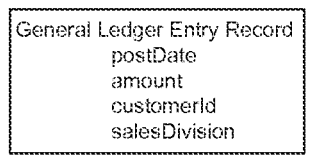
FIG. 2B illustrates a conventional list of the fields ordinarily associated with an exemplary General Ledger Entry Record.
Figure 2C:
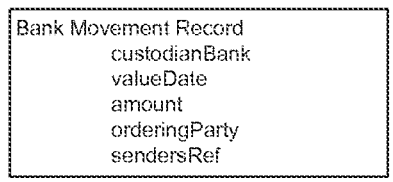
FIG. 2C illustrates a conventional list of the fields ordinarily associated with an exemplary Financial Institution Bank Movement Record.

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Shown in FIG. 3A, in accordance with an embodiment of this invention, is a flowchart illustrating at a high level an exemplary classifier process. In the present embodiment the process begins at a Step 370 with the access of the transaction records database table and the reading of all unmatched operational transaction records. A Step 373 follows which uses the appropriate domain definitions, feature definitions and classifier distribution data to determine an optimal set of event matches, where an event match may be a tuple comprising the transactions deemed to have been generated as a result of a common originating event, optionally along with the name of the type of that event. If a domain only includes two different record types, then an event match may comprise effectively of just a pair of transaction records.

A Step 376 follows with the storage of the optimal set of event matches in the event match database table. The process continues at a Step 379 where the event match database table is accessed and all non-nominal event matches may be manually reviewed and investigated by the system users. A non-nominal event match is one which corresponds to a non-nominal completion of a business event and which therefore requires some kind of followup resolution action. For the exemplary sales domain this might be an event match which consists of a sales event type, an invoice record and a ledger record. Such an event match is non-nominal because it does not include a bank movement record, and the absence of such indicates that the customer did not pay for the invoiced product—a non-nominal outcome. Review and investigation of a non-nominal event match may involve the users contacting other parties involved in the business event for clarification (for the example Sales event domain this might involve contacting the customer). After reviewing and investigating each non-nominal event match the users may find that some of the event matches are incorrect. As a non-limiting example, for the exemplary sales domain when a user investigates the event match which consists of a sales event type, an invoice record and a ledger record and no bank movement they may call the customer to find out where the payment is. After contacting the customer they might find out that the customer did in fact pay for the product but sent the funds very late (having caused the classifier to not match the late bank movement and hence not include it in the event match), in such a case the user operations team would deem that the event match was incorrect and in fact the late bank movement should be part of that event match. At a Step 382 any matching errors found by the users during their follow up investigations and actions are corrected by the users via a gui which allows them to edit the transactions belonging to the event match. Finally, at a Step 385, the automated classifier train and update process is executed which, based on the stored domain definitions and feature definitions uses the user reviewed and validated event matches to update the classifier distribution with new classifier data.

FIG. 3B is a flowchart illustrating an exemplary process for the classifier matching of operational transaction records in accordance with an embodiment of the present invention. In the present embodiment the process begins at a Step 300 with the access of the transaction records (records) database table and the determination of all unprocessed records. The exemplary process continues at a Step 310 with the collection of all unprocessed records into a considered transaction record set, and then follows at a Step 320 with the determination of all possible event matches for each record in the considered transaction record set. A Step 330 continues the process with the calculation of the normalized probability for each of said possible event matches and follows, at a Step 340, with the optimization of a selected set of the possible event matches. A Step 350 then stores the optimized event match sets to the event match database table and, at a Step 360, all considered transaction records are indicated as processed.

FIG. 4 is a flowchart illustrating an exemplary process for classifier matching of operational transaction records using a causal independence assumption to decompose each event match into a set of independent causal pair matches, in accordance with an embodiment of the present invention. A causal pair is a pair in which the first element a, of the pair is either an event or a record and the second element b of the pair is the generated record and is deemed to have been generated as result of a. In the present embodiment the process begins at a Step 400 with the access of the transaction records (records) database table and the determination of all unprocessed records. The exemplary process continues at a Step 410 with the collection of all unprocessed records into a considered transaction record set, and then follows at a Step 420 with the determination of all potential causal pairs for every record in the considered transaction record set. A Step 430 continues the process with the calculation of the relative accuracy probability for each causal pair (a,b) and, at a Step 440, follows with the calculation of the normalized accuracy probability Pnorm(a,b), for each causal pair. A Step 450 then calculates the accuracy quality value of each causal pair. Pnorm(a,b) and Q(a,b) are stored in 1060 in order to be made available for viewing by the users via a gui. In a Step 460 an optimization algorithm is used to select a set of causal pairs which maximize the sum total of accuracy quality values of the selected causal pairs and such that there is one (and only one) causal pair for each transaction record r where r is the second element of the pair. At a Step 470, for the optimally selected causal pairs the isOptimal field in 1060 is set to true. Continuing the process, at a Step 480, the originating event for each considered transaction r is determined as follows:

For an optimized causal pair (a, r) (where r is the second element) and a is an event, then a is the originating event for r. If for the optimized causal pair (a,r), a is a generator record, then the originating event for r is the originating event for a (which may be determined in the same manner from the optimized causal pair (g,a) where a is the 2nd element in the pair).

The originating event for each considered record is stored to the event match database table. At a Step 490 all considered transaction records are indicated as processed.

Figure 5:
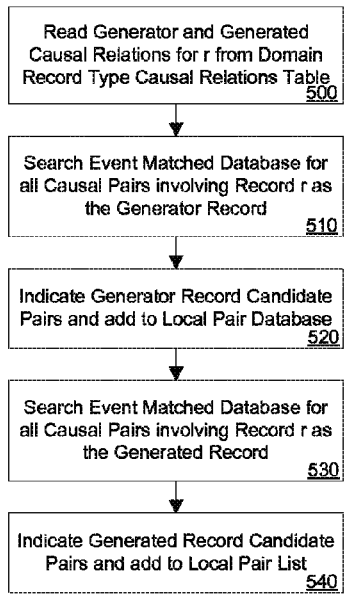
FIG. 5 is a flow chart illustrating an exemplary process for determining the set of all causal pairs which involve record r, in accordance with an embodiment of the present invention.

FIG. 5 is a flow chart illustrating an exemplary process for determining the set of all causal pairs which involve a record r as either the generator or the generated element in the causal pair in accordance with an embodiment of the invention. The process begins at a Step 500 with the access of the Domain Record Type Causal Relations database table to determine all (generator) causal relations where the record type of r is the generator type and all (generated) causal relations where the record type of r is the generated type of that causal relation. By way of non-limiting example, if the type of record r=invoice these would consist of the causal relations with (invoice, ledger entry), (invoice, bank movement) as the generator causal relations and (SalesEvent, invoice) as the generated causal relations. A Step 510 searches the transactions records database table for all causal pairs which pertain to one of the generator causal relations and where record r is the generator for the causal pair. A Step 520 continues the process with the indication of any identified generator causal pairs and stores the generator candidate pairs to the local pair list. A Step 530 searches the transaction record database table for all generated causal pairs which pertain to one of the generated causal relations and where record r is the generated record of the causal pair. A Step 540 continues the process with the indication of any identified generated record causal pairs and stores the generated record candidate pairs to the local pair list.

Figure 6:
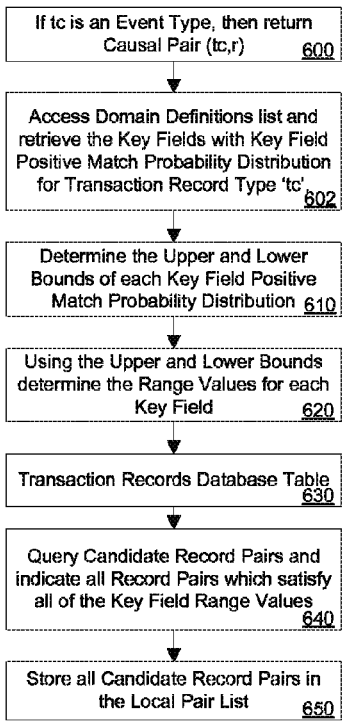
FIG. 6 is a flow chart illustrating an exemplary process for determining the set of all candidate records or candidate events of type tc satisfying key field positive match probability distribution range values, in accordance with an embodiment of the present invention.

FIG. 6 is a flow chart illustrating an exemplary process for determining the set of all candidate record pairs for a given causal relation and where r is either a generator record or a generated record and where the other generated/generator type of the causal relation is tc (so tc is the type of the generated record for a generator causal relation for r, or tc is the type of the generator in the case of a generated causal relation for r). For candidate types tc which are record types (i.e. not event types), the causal pair must meet a required likelihood based threshold (this is done for performance reasons in order to limit the number of causal pairs to be processed). This likelihood requirement is enforced by requiring that the candidate satisfies key field range bounds such that the probability of a causal pair being a correct match for r and and having key fields outside of these ranges is very low and below some apriori defined threshold percentage F. These key field range bounds are determined from the match probability distribution for the key fields by determining the lower and upper bounds of the cumulative feature probability distribution which includes percentage F of the total distribution. By way of non-limiting example, if the apriori and configurable defined threshold percentage=99.9% then the lower and upper cumulative probability density values are 0.001 and 0.999. By way of non-limiting example, if r is an invoice record, the causal relation (invoice, bank movement), the candidate record type 'tc' is bank movement where bank movement record type has key field amount, there is a feature called "amount difference" which is defined as the bank amount—the invoice billedAmount then if the amount difference feature value with a cumulative probability density of 0.001 is −0.03 and the amount difference feature value with a cumulative probability density of 0.999 is +0.05, then these values would be used to determine the range bounds for the amount key field for the bank movement candidates. Hence for an invoice record r with a billedAmount=$1250.00, then the positive match distribution range values for the amount field of candidate record type 'tc'=bank movement would be $1249.97 to $1250.05.

Referring in detail to FIG. 6, a step 600 if the generator type tc is an event type et, then the causal pair (et, r) is returned. In a Step 602 the Domain Record Type Definition database table is accessed and the key fields for record type tc are determined. The features for this causal relation and which involve these search fields are retrieved from the Domain Causal Relations Feature Definition database table. Positive match feature probability distributions, are retrieved for candidate record type 'tc' and record r. At a Step 610, for each key field related feature, the corresponding positive match feature probability distribution is read from the Domain Feature Probability Distribution and Domain Probability Distribution Bin tables. These distributions are used to derive the lower and upper bound feature range values for every key field. The process continues at a Step 620 combining the lower and upper bound feature values with the corresponding actual value of the key field of record r to establish the actual key fields positive match lower and upper range values. At a Step 630 the transaction records database table is accessed and, at a Step 640, candidate records c of type 'tc' from the transaction records database table are queried against each key field positive match lower and upper range values. At a Step 650 all successful positive match causal pairs (r,c) (if r is the generator for the causal relation) or (c, r) (if r is the generated for the causal relation) are indicated and stored in the local pair list. If r is a generator record, then the candidate causal pair (r, null) is also stored in the local pair list, since the case where no record of type tc was generated from r is also a potential valid causal pair. Any candidates which were retrieved but are not contained in the considered transactions list are added to the considered transactions store. This is to ensure that all the matches for each of these candidate records will also be found so that the match graph using during the optimization process is complete.

Figure 7:
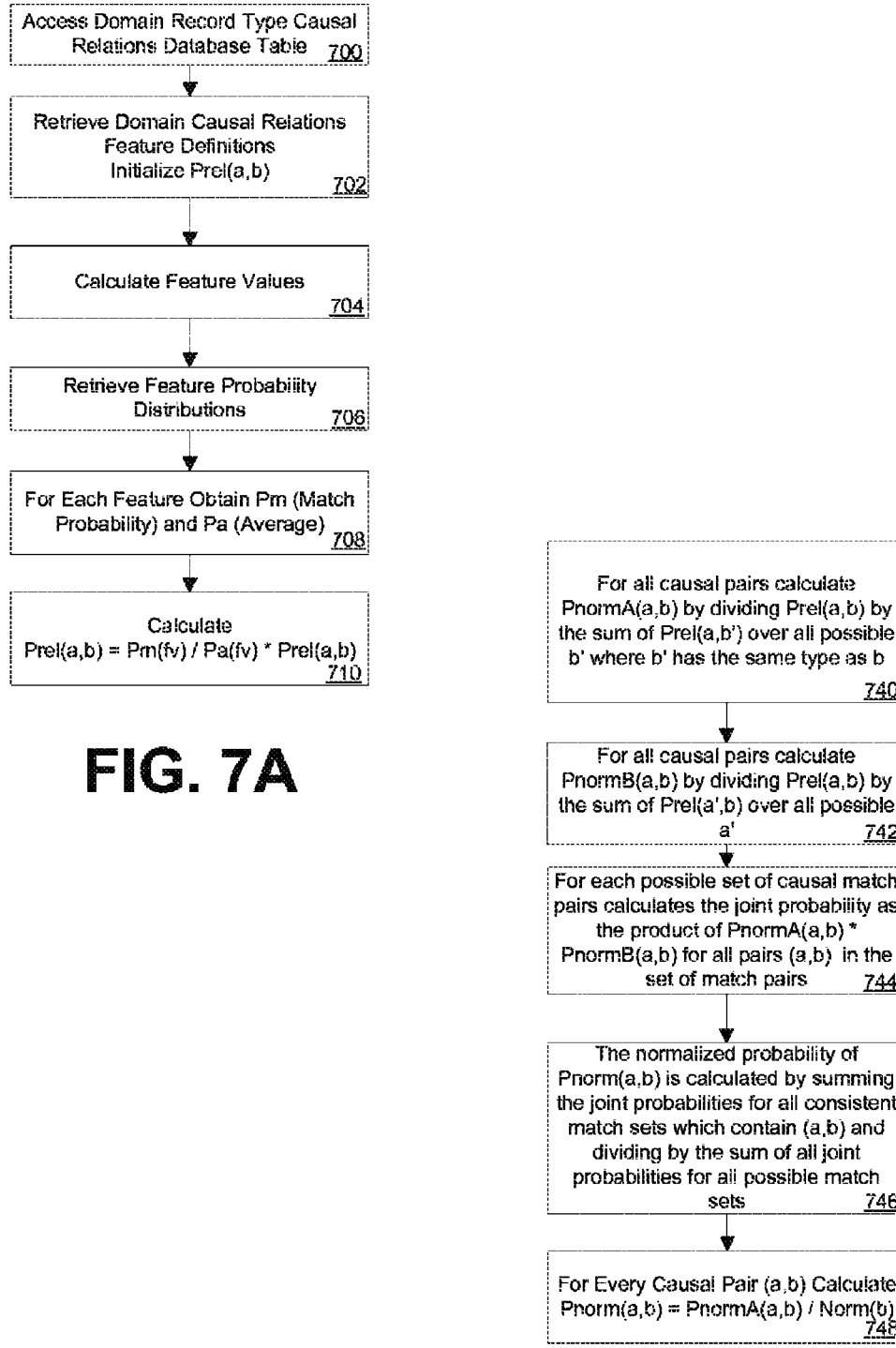
FIG. 7A is a flow chart illustrating an exemplary process for determining the relative causal match probability Prel (a,b) of a causal pair consisting of a generator event type a or generator record a and a generated record b, in accordance with an embodiment of the present invention.
FIG. 7B is a flow chart illustrating an exemplary process for calculating the normalized causal pair (a,b) match probability Pnorm(a,b), in accordance with an embodiment of the present invention.

Shown in FIG. 7A is a flow chart, in accordance with an embodiment of the invention, illustrating an exemplary process for determining the relative causal match probability Prel(a,b) of a causal pair consisting of an event type a, or generator record a and generated record b;

At a Step 700 the Domain Record Type Causal Relations database table 1160 is accessed and at a Step 702 the features are retrieved from Domain Causal Relations Feature Definitions for the type of the generator (which is either a record type or an event type) a and the type of the generated record b. The value of Prel(a,b) is initialised to 0.0. Following at a Step 704, for each retrieved feature, the feature value is calculated by evaluating the defined feature function for (a,b). At step 706 for each feature the match and average feature distributions are retrieved from the Domain Feature Probability Distribution database table for this particular pair of generator a (either event type or a record) and generated record b using the causal key values extracted from the pair. At a step 708 for every feature, the calculated feature value fv, is used to index into the retrieved match feature probability distribution to obtain Pm(fv)—(the feature match probability density for that feature value) and also to index into the retrieved average feature probability distribution to obtain Pa(fv) (the feature average probability density for that feature value). At step 710 for each feature, the relative causal match probability Prel(a,b) is multiplied by Pm(fv)/Pa(fv). As a non-limiting example, this may be an encoding of a Bayes non-parametric classifier.

Shown in FIG. 7B is a flow chart, in accordance with an embodiment of the invention, illustrating an exemplary process for determining the normalized probability of a causal pair. At a step 740 for all causal pairs calculate PnormA(a,b) by dividing Prel(a,b) by the sum of Prel(a,b') over all possible b' where b' has the same type as b.

At a step 742 for all causal pairs calculate PnormB(a,b) by dividing Prel(a,b) by the sum of Prel(a',b) over all possible a'.

At a step 744 the joint probability value is calculated for every possible consistent match set of causal pairs (which is a set of causal pairs such for each transaction record r, the set contains exactly one causal pair where r is the generated record). The joint probability of a match set of causal pairs is calculated as the product over all causal pairs (a,b) in the match set of (PnormA(a,b)*PnormB(a,b)). (Here and hereafter * denotes the multiplication operator).

At step 746 the normalized probability Pnorm(a,b) is calculated from the marginal probability over the joint distribution of (a,b). This is calculated by summing the joint probabilities for all possible consistent match sets which contain (a,b) and dividing this by the summed joint probabilities for all possible consistent match sets. In this manner the calculated Pnorm(a,b) is a contextualized probability which takes into account the effect of choosing that causal pair within the context of the overall match set assignment for all transaction records. Note that due to the high number of possible match sets, instead of explicitly enumerating all possible match sets, a random sampling approach such as Monte Carlo sampling may be used to estimate the marginal probability of (a,b) over all possible match sets.

The use of the marginal probability to calculate PNorm (a,b) corresponds to the quality function which is formulated in terms of the probability of each particular match (a,b) in the match set being incorrect.

Various alternative embodiments could use alternative formulations of the quality function which are formulated in terms of the probability of there being any mismatch in the match set (which would correspond to 1.0—the overall joint probability of the entire match set.). Since the joint probability is calculated from the product of PnormA(a,b) *PnormB(a,b) over all match pairs in the match set, the logarithm of this product may be formulated as the sum of of log(PnormA(a,b)*PnormB(a,b)) over all match pairs in the match set and is hence amenable to use of linear max match optimization approaches.

FIG. 8 shows how the quality values Q(a,b) for each causal pair is calculated from Pnorm(a,b). In general, the purpose of matching records together is to ascertain whether a given business process was fully and correctly completed and if not to take the necessary follow up actions to achieve the business goals.

In a non-limiting example for sales domain, the business goals might be:
Ensure that all invoices have been fully paid by the customer and that any overpayments or duplicate payments by the customer are returned to them.
Any erroneous bank charges should be followed up and corrected by the bank.
All invoices are accurately reflected on the ledger.
For record keeping purposes and compliance reasons, all records are associated with the correct sale.

For the example sales domain, in order to take the appropriate actions to achieve these business goals, it is required to know the correct generator for every invoice, ledger entry and bank movement.

Hence, if the matching process chooses the wrong causal match pair there will be a cost incurred since it produces accounting inaccuracies and also may lead to an inappropriate or lack of appropriate follow up action being taken by the users. These erroneous actions or missing actions have associated costs both monetary and reputational. The purpose of the quality function Q(a,b) is to quantify these expected costs for any given causal pair (a,b).

The cost of a mismatch from the perspective of the generated record may be considered as having three key components:
An operational accounting record keeping cost to take into account any future reporting issues based off the erroneous match.
The cost associated with any followup actions (if any) which will be erroneously taken based on an erroneous causal pair match.
The cost associated with the non-execution (or late execution) of any followup actions (if any) which should have been taken for the correct causal pair.

The first cost component may be characterized in terms of an accounting cost function (AccountingMismatchCost) which defines the cost of the accounting error in terms of the economic and other characteristics of the generated record b in the causal pair. A different AccountingMismatchCost function definition may be stored for each generated type (since the form of the function depends on the type of the generated record). An example AccountingMismatchCost for the example Sales domain for the bank movement generated record type (where b is the bank movement instance) might be:

$$\text{AccountingMismatchCost}(b)=1.0+0.00001*b.\text{amount}$$

In order to calculate the second and third cost components a policy mapping a causal pair to the necessary followup workflow actions for that pair may be required. This may be assumed to be an externally supplied policy function, whose input is a causal pair and whose output is the name of the required followup workflow (if any).

A non-limiting method of use for the present invention may be that it may be coupled with a workflow system which coordinates and or executes the necessary actions (including user actions) to ensure that the business goals are met for each pair. From the example domain for example, for the causal pair (bank service event, bank movement2) the externally supplied policy function might assign a workflow name of "NONE" (since no followup action is required for bank fees).

In a non-limiting example for the causal pair (invoice1, bank movement2) where the value of the amount field in bank movement2 is more than $50 less than the value of the invoice1 billing amount, the assigned workflow might be "CONTACT-CUSTOMER-FOR-REMAINING-FUNDS").

In addition to the workflow assignment policy, in order to calculate the second and third costs components the user may also need to supply a cost function (WorkflowMismatchCost) for each possible pair of workflows (workflowNameE, workflowNameM), where workflowNameE is the name of the erroneously executed workflow and workflowNameM is the name of the correct workflow which should have been executed.

The function WorkflowMismatchCost may determine the combined cost of the erroneous workflow workflowNameE and non-execution (or late execution) cost of the correct workflow workflowNameC in terms of the characteristics of the erroneous causal pair (a, b) and the correct causal pair (a', b).

For the example workflow pair where workflowNameE="CONTACT-CUSTOMER-FOR-REMAINING-FUNDS" and workflowNameC="NONE" a WorkflowMismatchCost cost function definition might be:

$$5.0 + *(a.\text{billedAmount} - b.\text{amount})$$

Where a is the invoice that the bank movement b was erroneously matched with.

For this non-limiting example the function represents a fixed reputational cost of 5.0+a reputational cost which may be linked to the amount of a make-up payment which the client is erroneously being asked for.

With the externally supplied workflow mapping policy and the definition of the WorkflowMismatchCost function, the mismatch cost for an erroneous causal match pair (a,b) where the correct causal match pair is (a', b) may be calculated.

To calculate the total expected workflow mismatch cost for a causal pair (a,b) therefore a summation is made of the workflow mismatch costs for (a,b) versus every viable alternative causal pair (a',b), multiplied by the normalized probability Pnorm(a',b) of that alternative causal pair being correct:

ExpectedMismatchCost(a,b)=AccountingMismatchCost(b)*(1−Pnorm(a,b))+Sum over all possible a' of (WorkflowMismatchCost(a,a',b)*Pnorm(a', b)). Where a' is not equal to a.

The quality of a causal match pair (a,b) is defined as −1.0*ExpectedMismatchCost(a,b) and hence maximizing the quality is equivalent to minimizing the expected cost.

In a non-limiting example if the user does not wish to define workflow mismatch costs, they may define the quality function value for a pair (a,b) as simply Pnorm(a,b). In this case the optimization of the sum of the match pair qualities for a match set is equivalent to minimizing the total expected number of mismatches for that match set. Alternative embodiments may use different formulations for the quality function.

Referring to FIG. 8 again, a step 802 retrieves all causal candidate pairs from the causal pair list. A step 804 takes the next causal pair (a,b). The accounting mismatch cost function for the type of b is retrieved from the Accounting Mismatch Cost Function database table 814 and the function is evaluated for b. The value of Q(a,b) is set to (1−Pnorm(a,b)) multiplied by the calculated accounting mismatch cost value. The externally supplied workflow policy function is called to determine the workflow (workflowE) for (a,b).

A step 806 retrieves all alternative causal pairs (a', b) from the causal pair list where the second element is b and the first element a' is not equal to a.

In a step 808 for each alternative causal pair (a'b), the external workflow assignment policy function is called to determine workflowC, the assigned workflow for (a',b). Using workflowNameE and workflowNameC, the WorkflowMismatchCost function definition is retrieved from the Workflow mismatch Cost function database table 816. The function is evaluated for the pairs (a, b) and (a', b). The value of the evaluated workflow mismatch cost multiplied by Pnorm(a',b) is subtracted from the value of Q(a,b).

A step 810 checks if there are any causal candidate pairs for which Q has not been calculated. If so it returns to step 804.

FIG. 8A shows the database table used for storing the AccountingMismatchCost function definition for each generated record type in 814 and the workflow mismatch cost definitions for each (erroneous workflow name, correct workflow name) pair in 816.

Once Q(a,b) has been calculated for all causal pairs, a set of causal pairs is chosen such that every record r is the generated record in one and only one causal pair and such that the sum of the quality values over all of the selected pairs is maximized. In the many embodiments, this may be achieved via the use of a bipartite graph maximum matching algorithm. A bipartite graph is a graph whose vertices can be divided into two disjoint sets U and V such that every edge connects a vertex in U to one in V. Such a graph may be formed for each record type by creating a bi-partite graph where the set of vertices in V consists of all considered records of that type (where the meaning of considered set of considered transactions is as described in FIG. 4). The vertices for U are formed from all possible events or records which could have generated any of the records in V. In many embodiments, in order to limit the size of the graph which has to be processed by the bipartite graph maximization algorithm, the graphs are constructed individually for each related set of generator and generated records.

FIG. 8B shows the process which selects the generator for each record, such that the sum of the quality values for the selected causal pairs is maximized. A step 822 retrieves the next record from the set of considered records and which has not yet had its generator chosen. In a step 824 the graph is initialized to U={ } (where { } is the empty set) and V={ } and the set of edges E is initialized to { }. A step 826 calls function augmentGraphForGenerated(b). This function first marks b as having been added to the graph as a generated item. It then adds record b into the set V and then for all possible generators a for b (i.e. (a,b) is a causal pair) adds in the edge (a,b) with the weight Q(a,b) and calls the function augmentGraphForgenerator(a). The function augmentGraphForGenerator(a) adds a to the vertex set U and determines all other possible records b' which could have been generated by a (and where b' is of the same type as the other records in V). This can also include null generated records (which represent the situation where no record of that type is generated by a). For each of these b' records, augmentGraphForGenerated(b') is called recursively to add in each of these related records into the graph (if they haven't already been added to the graph). This recursion may continue until all related generators and generated records have been added to the graph.

In a step 828 following the construction of the graph, a bipartite max match algorithm is called to select those edges which maximize the sum of the edge weightings (Q(a,b)) whilst ensuring that each and every vertex in V has a single incoming edge (which defines which record or event generated that record) and whilst ensuring that each vertex in U has a maximum of one outgoing edge (for a given causal relation type there is only one record generated from that generator). The chosen generator for every record in V is stored. Each record in V is indicated as having had its generator chosen. Step 830 checks if there are any more records for which the generator has not yet been stored. If there are, then the process returns to step 802, otherwise the process completes. Alternative embodiments may use other optimization techniques, including but not limited to simulated annealing, genetic algorithms to select the optimal edges.

Figure 9:
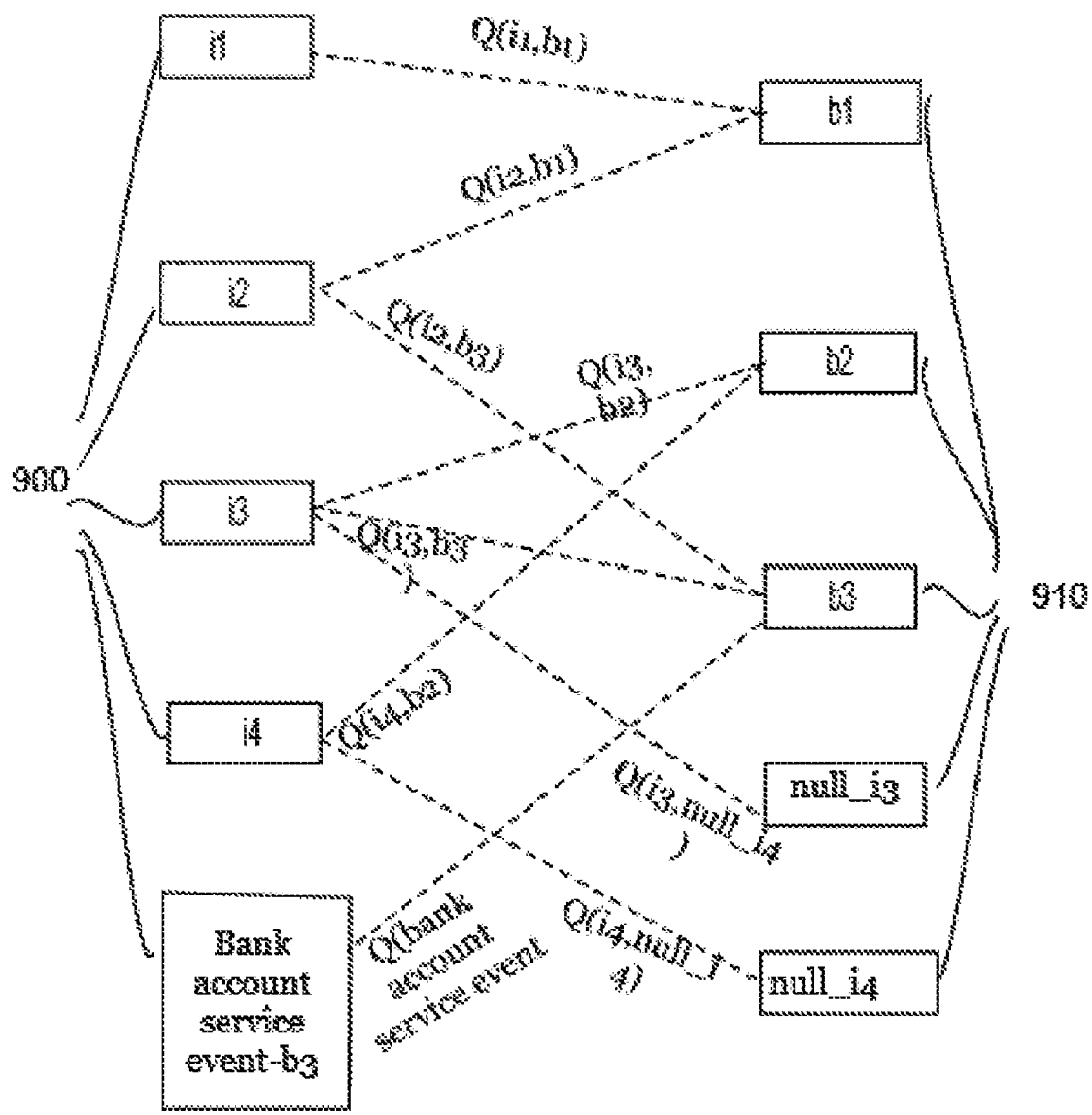
FIG. 9 shows an example match graph constructed for the example sales domain, in accordance with an embodiment of the present invention.

FIG. 9 shows an example match graph constructed during step 806. In this example augmentGraphForGenerated has been called with the parameters U={ }, V={ }, b=b1, where b1 is a "Bank movement". b1 has been added into the set of vertices V (910) and all possible causal pairs where b1 is the generated element are retrieved from the causal pair store list (in this example (i1, b1) and (i2, b1)). Edges for each of these have been added into the graph with weights Q(i1, b1) and Q(i2, b1).

Each of these generators i1 and i2 have had augmentGraphForGenerator called for each of them and hence have been added to U (900). For i2 augmentGraphForGenerator identifies (i2, b3) as a causal pair and calls augmentGraphForGenerated for b3. This call identifies all the possible generators of b3: i2 and i3 and the bank account service event (which is given a unique id consisting of the event type and the id of the record which it generated) and adds the edges (i2, b3) and (i3, b3), (bank account service event-b3, b3) into the graph with the weights Q(i2, b3), Q(i3, b3) and Q(bank account service event-b3, b3) respectively. augmentGraphForGenerator is called for the generator i3. This identifies b2 and null_i3 as other bank records which this generator could have generated. (null i3 indicates that i3 did not generate a bank movement—the suffix i3 is used to create a unique vertex to represent this missing generated record). augmentGraphForGenerated is called for b2 which identifies i3 and i4 as generators for b2 and adds the edges (i3, b2) and (i4, b2) into the graph with the weights Q(i3, b2) and Q(i4, b2). augmentGraphForGenerated is called for null_i3 and adds the edges (i3, null_i3) into the graph with the weights Q(i3, null_i3).

Figure 10A:
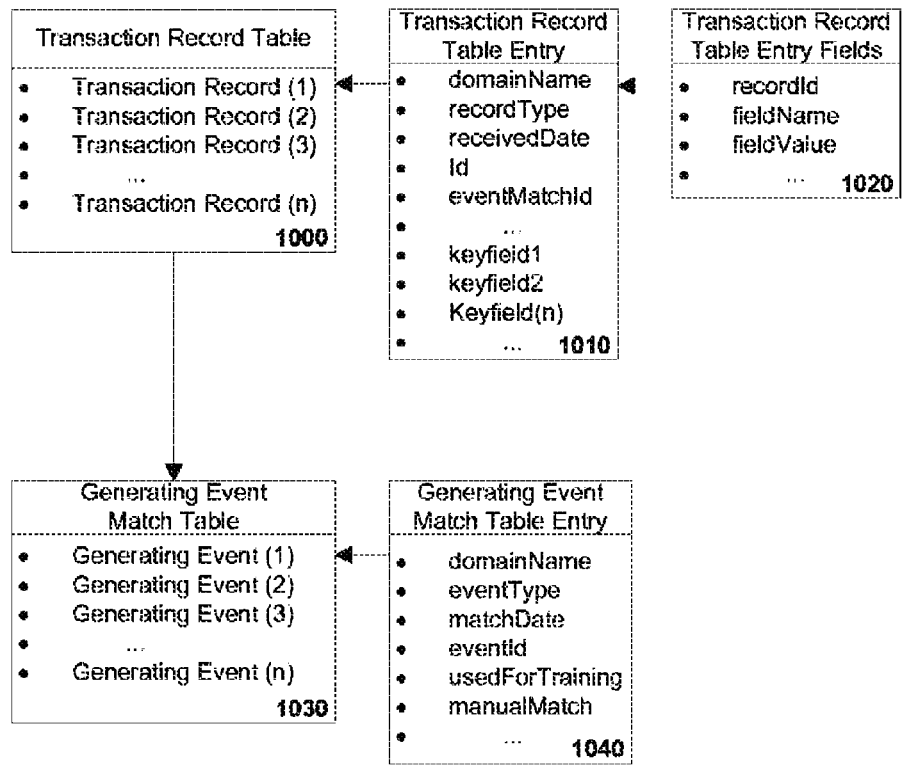
FIG. 10A illustrates an exemplary entity relationship diagram for transaction records and event matches, in accordance with an embodiment of the present invention.

In accordance with an exemplary embodiment of the invention, FIG. 10A shows an entity relationship diagram for transaction records and event matches. In this exemplary embodiment, transaction record table 1000 shows a typical business transaction record table which will typically contain a record for each business transaction.

Further to this exemplary embodiment, each business transaction record contained in transaction record table 1000 will contain a transaction record table entry 1010 comprised of multiple fields related to the business transaction record (e.g., domainName, recordType, receivedDate, id, eventMatchId, keyField(n)). By way of non-limiting example the transaction record table entry 1010 domainName field may contain a value of the domain to which the business transaction record belongs (e.g., "Sales Domain"). The transaction record table entry 1010 recordType field may contain a name of the business transaction record type (e.g., "invoice", "bank movement"). The transaction record table entry 1010 receivedDate may contain a date that the business transaction record was received. The transaction record table entry 1010 id field may be an identifier for the business transaction record. The transaction record table entry 1010 field eventMatchId may contain an identifier for the eventMatch to which the business transaction record was matched (or a null identifier if the business transaction record has not yet been matched). Transaction record table entry 1010 keyField(n) typically contain values of the key fields defined for that business transaction record type. These key fields are typically copies of business transaction record fields which have been designated as searchable. For example for business transaction record type "Bank movement" keyField1 might be defined as "valueDate" and keyField2 as "amount" and in this exemplary case the values of these fields would contain a bank movement's valueDate and amount values.

Further to this exemplary embodiment, each transaction record table entry 1010 will have a corresponding set of transaction record table entry fields 1020. Each transaction record table entry field 1020 contains the field value for the specified fieldName. By way of non-limiting example for an exemplary bank movement transaction record table entry 1010 with bank movement transaction record id 505 there may be four related transaction record table entries 1020 each with a recordId of 505. One record field table entry 1020 may have a fieldName value of "valueDate" and the fieldValue would contain the bank movement's valueDate (e.g. "2013-01-27"). One record field table entry 1020 may have a fieldName of "amount" and the fieldValue would contain bank movement's amount (e.g. "1054.45"). One record field table entry 1020 may have a fieldName of "orderingParty" and the field value would contain the bank movement's orderingParty (e.g. "ACME Ltd"). One record field table entry 1020 may have a fieldName of "sendersRef" and the fieldValue would contain the bank movement's sendersRef (e.g. "REF 4543").

Figure 14:
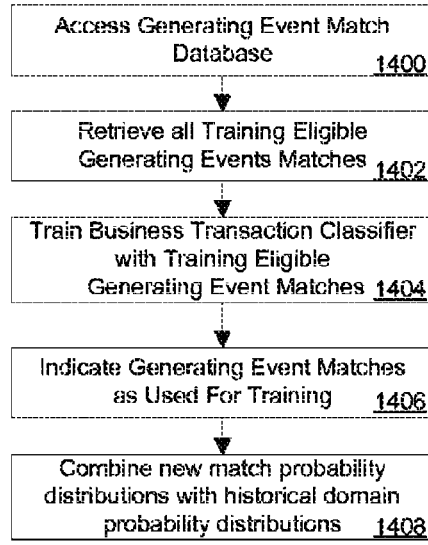
FIG. 14 illustrates a flow chart of a general exemplary process for training the business transaction classifier using event matches, in accordance with an embodiment of the present invention.

Shown in 1030 is a typical generating event match table. Typically, a generating event match table 1030 will contain a generating event match table entry 1040 comprised of multiple fields (e.g., domainName, eventType, matchDate, eventId, manualMatch) related to each generating event. By way of non-limiting example the generating event match table entry 1040 domainName field may contain a value of the domain to which the generating event belongs (e.g., "Sales Domain"). The generating event match table entry 1040 eventType field may contain a name of the event type (e.g., sales event, financial institution service event, erroneous payment event). The generating event match table entry 1040 matchDate value may contain a date that the generating event was matched. The generating event match table entry 1040 eventId field value may contain an identifier for the generating event. Typically, for each successfully matched record, the generating event match table entry eventId field value will also be stored in the corresponding transaction record table entry 1010 eventMatchId field. Typically the generating event match table entry 1040 usedForTraining field value will indicate whether the generating event match has been used for training the business transaction record classifier process (FIG. 14). Typically the generating event match table entry 1040 manualMatch field value will indicate whether the record match was created automatically by the matching process or manually by a user.

Figure 10B:
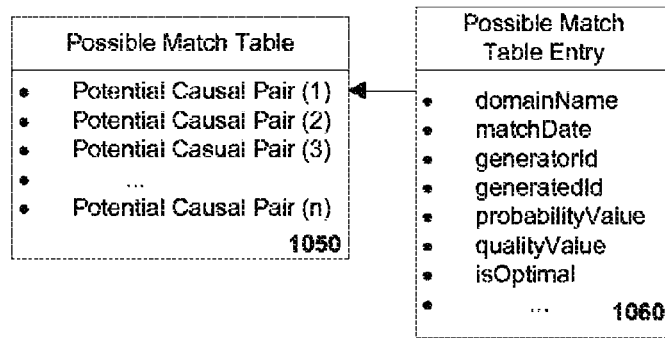
FIG. 10B illustrates a exemplary typical possible match table, in accordance with an embodiment of the present invention.

In accordance with an exemplary embodiment of the invention, FIG. 10B shows a typical possible match table 1050. Typically, a possible match table 1050 will contain a possible match table entry 1060 comprised of multiple fields (e.g., domainName, matchDate, generatorId, generatedId, probabilityValue, qualityValue, isOptimal) for each potential causal pair identified during the matching process. By way of non-limiting example the possible match table entry 1060 domainName field may contain a value of the domain to which the potential causal pair belongs (e.g., "Sales Domain"). The possible match table entry 1060 matchDate value may contain a date that the potential causal pair was identified. The possible match table entry 1060 generatorId field value may contain an identifier of the potential causal pair generating event or generating record. Typically, the possible match table entry 1060 generatedId field value will contain an identifier of the generated record of the potential causal pair. Typically, the possible match table entry 1060 probabilityValue field will contain the normalized probability value of the possible causal pair match. Typically, the possible match table entry 1060 qualityValue field will contain the quality value of the potential causal pair match. Typically, the possible match table entry 1060 isOptimal field will specify whether the potential causal pair match was selected as part of the optimal match set. Occasionally, the possible match table entries 1060 are manually reviewed by the user to assess each possible causal pair match and the respective match probability and quality value.

Figure 11A:
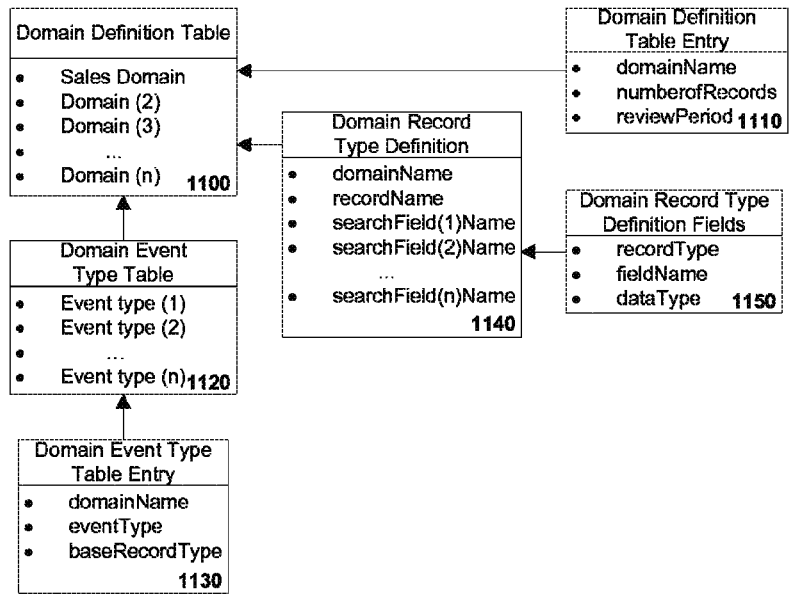
FIG. 11A illustrates an exemplary relationship diagram for a database representation of the domain causal relations and features for those causal relations, in accordance with an embodiment of the present invention.

FIG. 11A, in an exemplary embodiment of the invention, shows the entity relationship diagram for a database representation of the domain characteristics. Shown in 1100 is a typical domain definition table. Domain definition table 1100 will typically contain a definition for each business domain.

Further to this exemplary embodiment, each domain definition in domain definition table 1100 will contain a domain definition table entry 1110 comprised of multiple fields related to the domain definition (e.g., domainName, numberofRecords, reviewPeriod). By way of non-limiting example the domain definition table entry 1110 domainName field may contain a value of the name of the domain (e.g., "Sales Domain"). The domain definition table entry 1110 numberofRecords field may contain a value of the number of record types in that domain. The domain definition table entry 1110 reviewPeriod may contain a value of the operational review period for matches.

Continuing this exemplary embodiment, shown in 1120 is the domain event type table which contains an entry for each event type defined for each domain. By way of non-limiting example, for the sales domain there may be three event types defined, the sales event, the financial institution service event and the erroneous payment event. Each domain event type in domain event type table 1120 will contain a domain event type table entry 1130 comprised of multiple fields related to the domain event type (e.g. domainName, eventType, baseRecordType). The domain event type entry 1130 domainType field may contain a value of the name of the domain (e.g., "Sales Domain"). The domain event type entry 1130 eventType field may contain a value of the name of the event (e.g., "sales event"). The domain event type entry 1130 baseRecordType field may contain a value of the generated record type for the event. By way of non-limiting example, the baseRecordType value for the sales event may be "invoice" and the baseRecordType value for the financial institution account event may be "bank movement".

Further to this exemplary embodiment, each business domain in the domain definition table 1100 will typically have multiple corresponding domain record type definitions entries in 1140. By way of non-limiting example, for the sales domain there may be three record types defined, the invoice record type, the general ledger entry record type and the bank movement record type. Each domain record type definition may be comprised of; a domainName field which may contain the value of a name of the domain to which the record is associated, a recordName field which may contain the value of a name of the record type, and one or more searchField(n)Name fields which may contain the value of a key search field as may be used in a causal pair candidate search. By way of non-limiting example the bank movement record type may have a searchField(1)Name field value of "valueDate" and may have a searchField(2)Name field value of "amount".

Continuing this exemplary embodiment, each domain record type definition 1140 will typically have a corresponding set of domain record type definition fields 1150. Each set of domain record type definition fields 1150 may be comprised of; a recordType field containing the value of a name of the record type, a fieldName field containing the value of a name of the record field, and a dataType field containing the value of a field data type. By way of non-limiting for a bank movement record type there may be domain record type definition fields comprised of recordType "Bank movement", fieldName "valueDate" and dataType "Date". Furthering this non-limiting example there may be domain record type definition fields comprised of recordType "Bank movement", fieldName "amount" and dataType "Decimal".

Figure 11B:
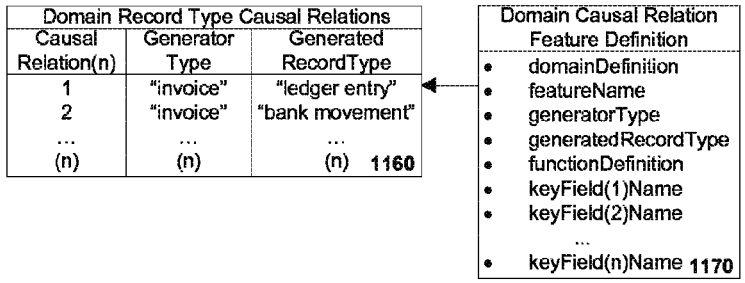
FIG. 11B illustrates an exemplary set of typical domain generator type to generated domain record type causal relations, in accordance with an embodiment of the present invention.

FIG. 11B illustrates a set of typical generator type to generated domain record type causal relations. FIG. 11B, in an exemplary embodiment of the invention, shows that each generator type may have one or more generated record type causal relations 1160 each comprised of a generatorType entry (which is either an event type or a record type) and a generatedRecordType entry. By way of non-limiting example, the sales domain may have a first record type causal relation 1160 comprised of a generatorType "invoice" and a generatedRecordType "ledger entry". The sales domain may have a second record type causal relation 1160 comprised of a generatorType "invoice" and a generatedRecordType "bank movement".

Further to this exemplary embodiment of the invention, there are typically domain causal relations feature definitions 1170 for each domain record type to domain record type causal relation 1160, each domain event type to domain record type causal relation (not shown) and each domain event type to domain base record type 1130 causal relation. Exemplary domain causal relations feature definitions may be comprised of; a domainDefinition field which may contain the value of a domain name, a featureName field which may contain the value of a causal relations feature identifier, a generatorType field which may contain the value of a generator type, a generatedRecordType which may contain a value of a generated record type, a functionDefinition field which defines the form of the feature function, and one or more keyField(n)Name fields which each may contain a value of the causal key values from the generator event or generator record and the generated record. By way of non-limiting example a domain causal relations feature definition 1170 may contain a featureName field value "AmountDifference" with a functionDefinition field value "invoice.billedAmount—ledger.amount". Continuing this non-limiting example "AmountDifference" feature definition, keyField1Name field may have a value of "invoice.customerId", keyField2Name field may have a value of "null" (null indicates that there is no causal key defined for that key field) and keyField3Name may have a value of "null".

Figure 12:
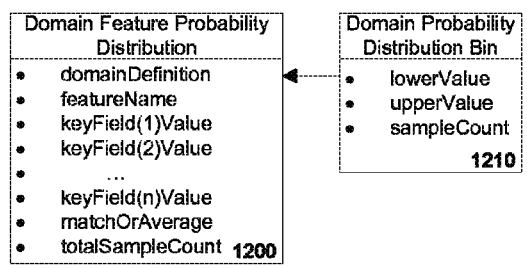
FIG. 12 illustrates an exemplary domain feature probability distribution relationship diagram for a domain feature probability distribution database, in accordance with an embodiment of the present invention.

FIG. 12, in an exemplary embodiment of the invention, shows a domain feature probability distribution relationship diagram for a domain feature probability distribution database. Shown in 1200 is a typical domain feature probability distribution definition comprised of multiple fields. By way of non-limiting example the domain feature probability distribution definition 1200 may have a domainDefinition field which may contain the value of a domain name (e.g., "sales"), a featureName field which may contain the value of a domain feature identifier (e.g., "AmountDifference"), one or more keyField(n)Value fields which may typically contain values of the key fields defined for that domain feature probability distribution definition, (e.g., "ACME" which may be a customer identifier for the sales domain), a matchOrAverage field which may contain a value indicating whether the domain feature probability distribution definition 1200 is the distribution over verified causal pair matches or is an average distribution over all possible combinations of causal pairs for that causal relation and which may or may not be valid matches, and a totalSampleCount field which may contain a value of the total sample count of the domain feature probability distribution definition 1200.

Furthering this exemplary embodiment, a domain feature probability distribution definition 1200 may have multiple domain feature probability distribution bins 1210, one for each bin in a domain feature probability distribution definition 1200 histogram. Typically a domain feature probability distribution bin 1210 may be comprised of a lowerValue field which may contain a value of a lower value for the bin, an upperValue field which may contain a value of an upper value for the bin, and a sampleCount field which may contain a value for an observed sample count for the bin.

Figure 13A:
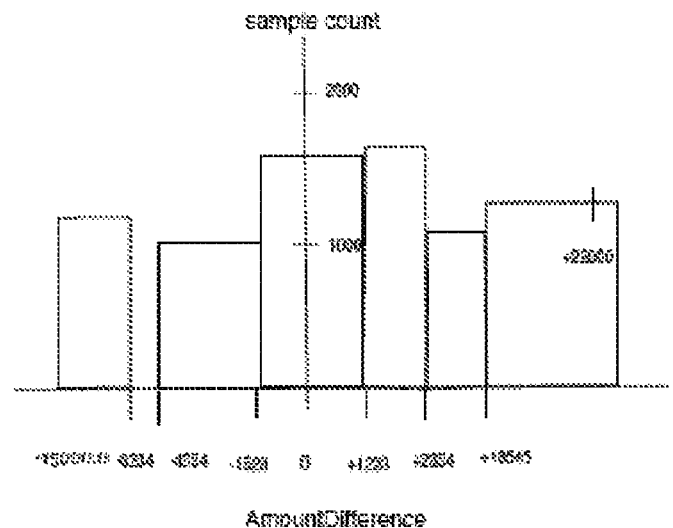
FIG. 13A illustrates an exemplary histogram for the domain feature probability distribution for an average probability distribution for a domain feature "AmountDifference", in accordance with an embodiment of the present invention, in accordance with an embodiment of the present invention.
Figure 13B:
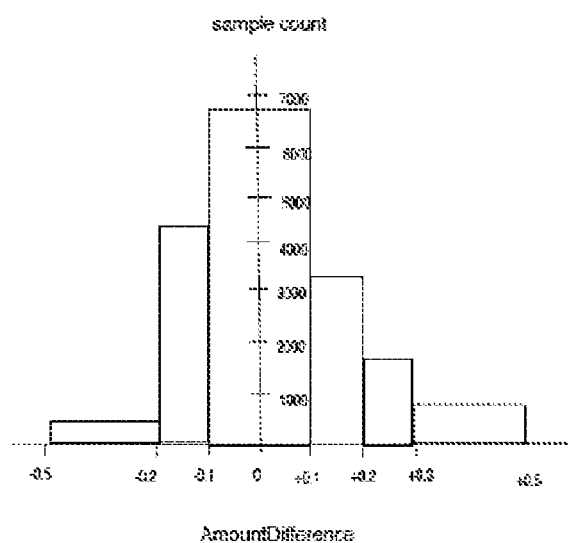
FIG. 13B illustrates an exemplary histogram for the domain feature probability distribution for matched records for a domain feature "AmountDifference", in accordance with an embodiment of the present invention.

By way of non-limiting example in accordance with an embodiment of this invention, FIG. 13A shows a domain feature probability distribution histogram for an average probability distribution over all possible invoice—bank movement pairs where the invoice customer id="ACME" for a domain feature "AmountDifference". Further to this non-limiting example, FIG. 13B shows a domain feature probability distribution histogram for invoice-bank movement validated correct match causal pairs where the invoice customer id="ACME" for a domain feature "AmountDifference".

Shown in FIG. 14 is a flow chart in accordance with an embodiment of this invention which illustrates an exemplary process for training the business transaction classifier.

At a Step 1400 the business transaction classifier training process may access the generating event match table 1030 and at a Step 1402 retrieve all generating event matches which may be eligible to be used for training the business transaction classifier. The generating event match may be eligible for training the business transaction classifier if the generating event match table entry 1040 usedForTraining field does not indicate that the generating event match has previously been used for training the business transaction classifier and, the generating event match is older than a domain operation review period. By way of non-limiting example the domain operation review period may be the period of time in which an operations team needs to review the automated generating event matches. Further, at a Step 1404, the retrieved training eligible generating event matches are used to train the business transaction classifier, providing a set of generating event match probability distributions. Continuing this exemplary embodiment at a Step 1406 generating event matches that have been used for training the business transaction classifier may be indicated as being used for training by updating the value of the generating event match table entry usedForTraining field. At a Step 1408 the training generating event match probability distributions may be combined with the historical domain feature probability distributions 1200 and further the new probability distribution bins may be combined with the historical domain probability distribution bins 1210.

Figure 15:
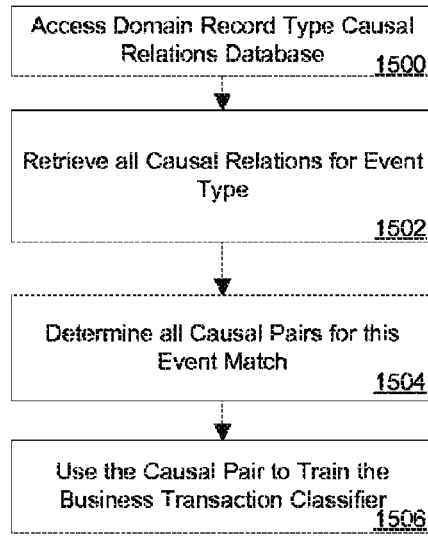
FIG. 15 illustrates a flow chart of an exemplary process using the assumption of causal independence for training the business transaction classifier using causal pairs matches, in accordance with an embodiment of the present invention.

Shown in FIG. 15 is a flow chart in accordance with an embodiment of this invention which illustrates an exemplary process for training the business transaction classifier using a business transaction generator event match and associated business transaction records.

At a Step 1500 the business transaction classifier training process may access a domain record type causal relations 1160 database table and at a Step 1502 retrieves a domain event type definition and all causal relations for the event type of the given event match. Following at a Step 1504 for each retrieved causal relation a causal pair is formed from records retrieved from the transaction record table 1010 for that eventMatchId and with types appropriate for that causal relation. At a Step 1506 each of these causal pairs is used to train the business transaction classifier.

Figure 16:
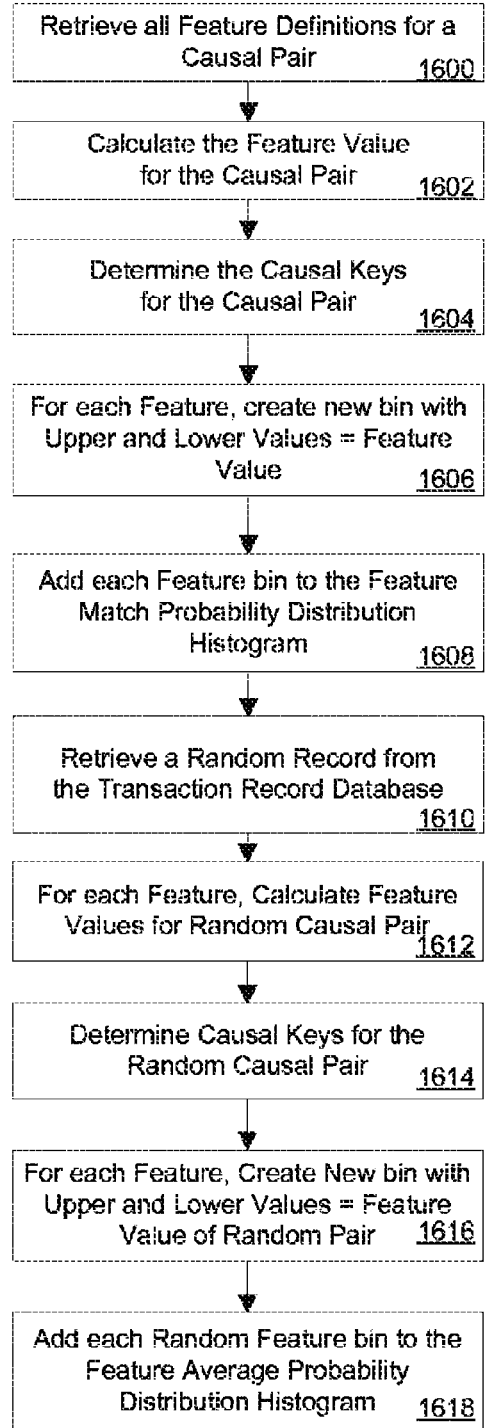
FIG. 16 illustrates a flow chart of an exemplary process for training the business transaction classifier for a single causal pair, in accordance with an embodiment of the present invention.

Shown in FIG. 16 is a flow chart in accordance with an embodiment of this invention which illustrates an exemplary process for training the business transaction classifier using a causal pair (a,b).

At a Step 1600 the domain record type causal relations 1160 database is accessed and all feature definitions are retrieved for the causal pair (a,b). At a Step 1602 each feature definition for the causal pair is used to calculate a feature value for the causal pair. At a Step 1604 for every feature, the values of the causal keys for the feature probability distribution are determined from the causal pair. At a Step 1606 for each feature a new bin is created with lower and upper bin values equal to the feature value for the pair. At a Step 1608 each causal pair feature bin is added to the feature match probability distribution histogram for the determined causal key values. The exemplary process continues at a Step 1610 with a random causal pair (a, r) formed using a random record r of same type of b selected from the Transaction Record database table. At a Step 1612 for each feature, the feature value is calculated using the random causal pair (a,r) a. At a Step 1614 the causal keys are determined for random causal pair (a,r) and at a Step 1616 for each feature a new bin is created with lower and upper bin values equal to the random feature value. At a Step 1618 for each feature the random pair feature value is added to the average histogram probability distribution for that feature for the determined causal keys.

Figure 17:
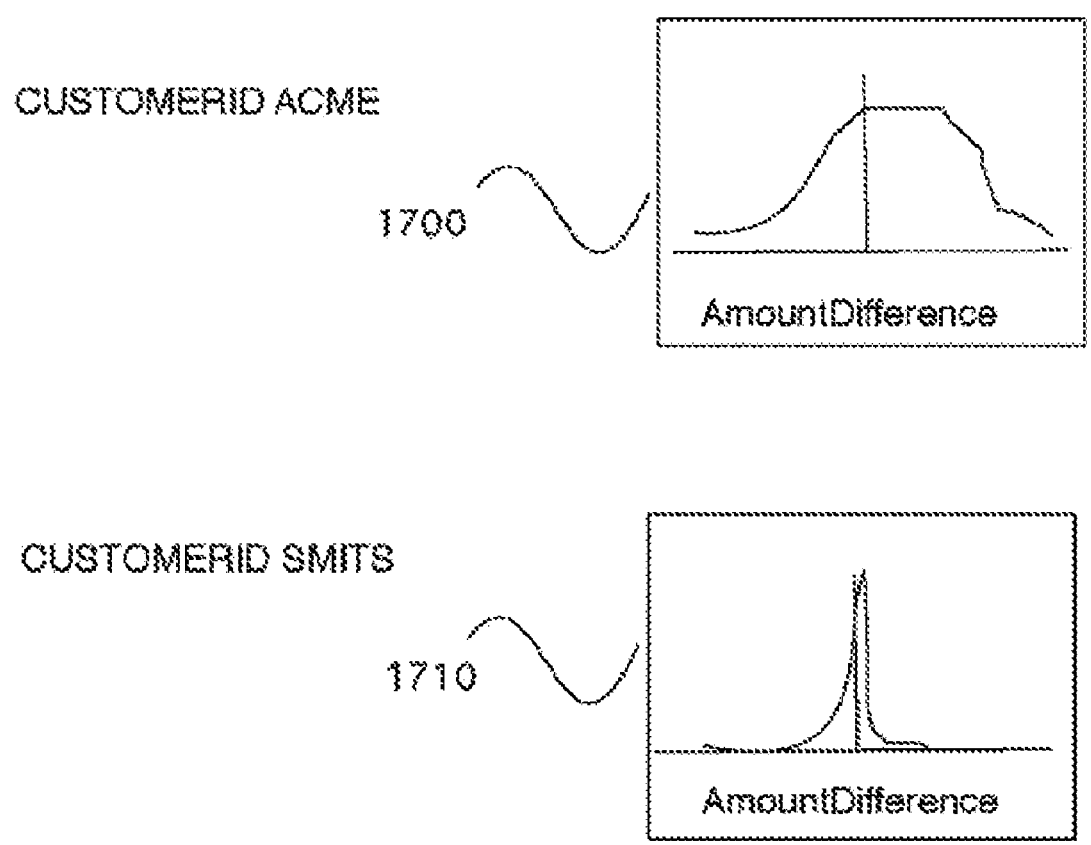
FIG. 17 illustrates an exemplary reporting user interface, in accordance with an embodiment of the present invention.

FIG. 17 illustrates an exemplary reporting user interface in accordance with an embodiment of the present invention. In this non-limiting example 1700 shows a conventional matched record probability distribution for a typical feature AmountDifference of a typical causal key customerId ACME. Further to this non-limiting example 1710 shows a conventional match probability distribution for a typical feature AmountDifference for a typical causal key customerId SMITS. Said reporting user interface may allow a typical user to identify customers with payment difficulties.

Reporting user interface FIG. 17 may also provide a display of covariance between two or more typical features. Additionally reporting user interface may allow for trend analysis of a typical causal key probability distribution. Reporting user interface may also provide information concerning timely payment compliance i.e. whether an invoice payment is received within a period of time following the date of said invoice.

Reporting user interface FIG. 17, in an exemplary embodiment in accordance with the invention, may also check whether an automated match is in accordance with a typical set of compliance conditions. By way of non-limiting example a typical invoice transaction record and a typical bank movement transaction record may be automatically matched and have significantly different amounts. The transaction records may be put into a typical compliance report which may highlight to a user that a match may need to be reviewed. The compliance report may show a match with a normalized probability value or quality value that may be below a threshold and may indicate to a user that a match may need to be reviewed. Reporting user interface may also allow a user to edit a match probability distribution. Reporting user interface may also allow a user to view a match probability distribution decomposed by a varied criteria causing a variance in the characteristic of the match probability distribution. Reporting user interface may allow a user to refine typical causal key definitions.

Figure 18:
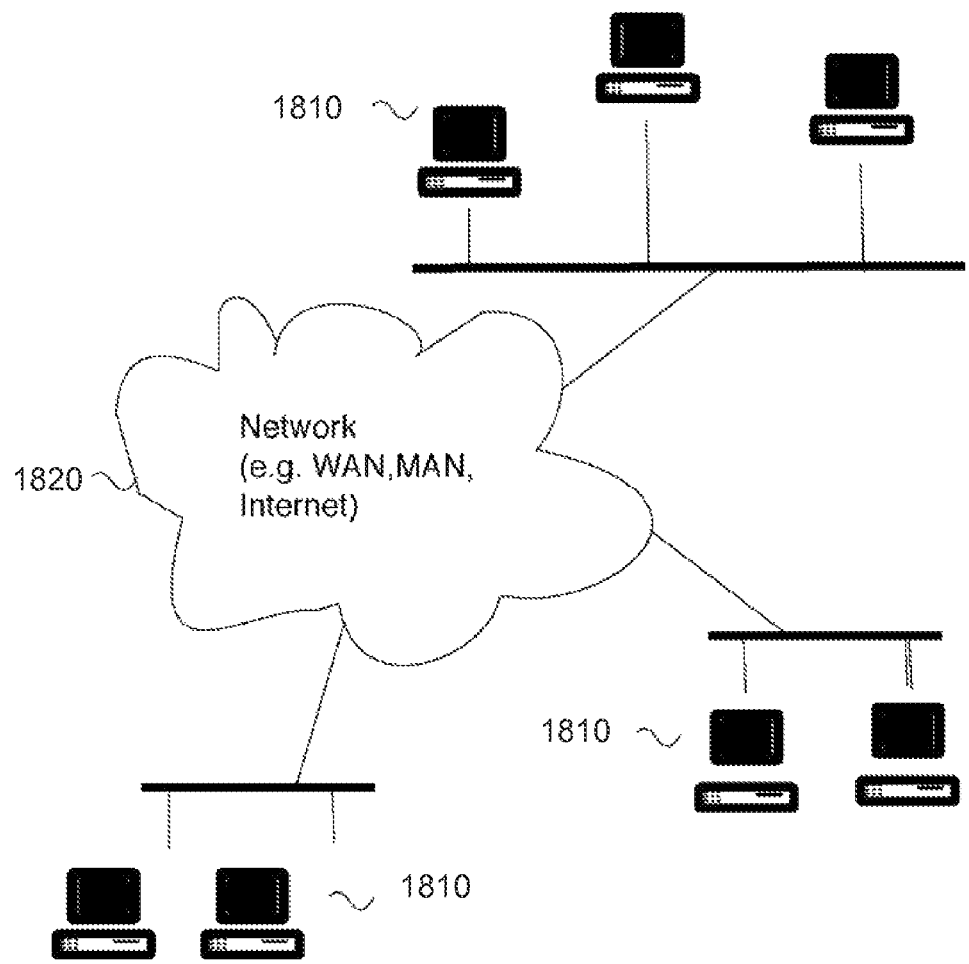
FIG. 18 illustrates an exemplary digital processing environment in accordance with an embodiment of the invention.

FIG. 18 illustrates an exemplary digital processing environment in accordance with an embodiment of the invention. Digital data processors 1810 may be coupled via a local area network (LAN), a wide area network (WAN), a metropolitan area network (MAN), an internet and/or other customary networks or communications media (collectively 1820). Digital data processors 1810 may comprise personal computers, work stations, mainframes, embedded processors and/or other digital data processing apparatus. Digital processing environment (FIG. 18) may be a conventional corporate or enterprise network environment or any other computing environment, networked or otherwise.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed serve as a computer system in which those aspects of the invention may be embodied.

Figure 19:
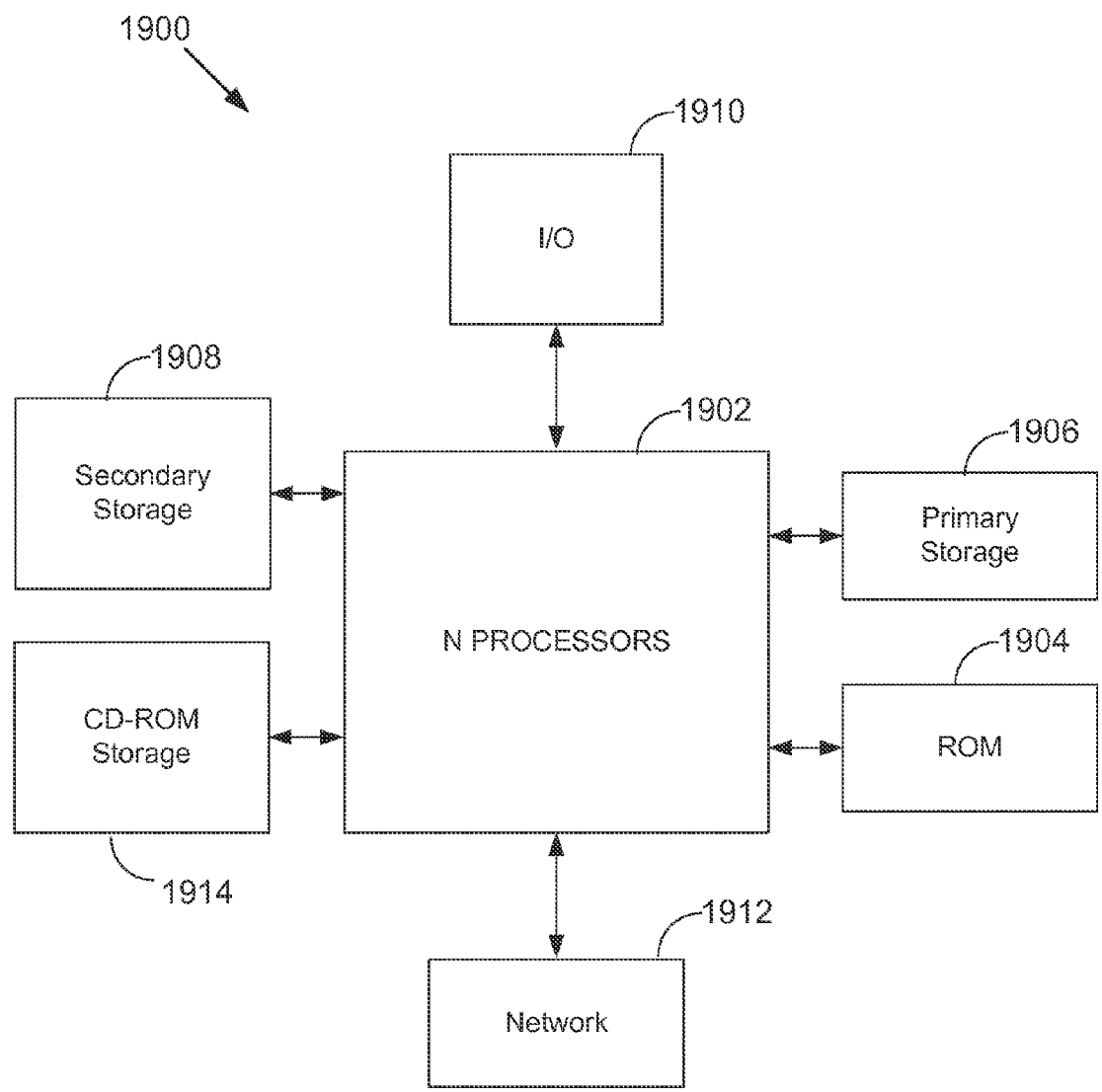
FIG. 19 illustrates a typical computer system that, when appropriately configured or designed, can serve as a computer system in which the present invention may be embodied.

FIG. 19 illustrates a typical computer system that, when appropriately configured or designed, can serve as a computer system 1900 in which the present invention may be embodied. Computer system 1900 includes a quantity of processors 1902 (also referred to as central processing units, or CPUs) that are coupled to storage devices including a primary storage 1906 (typically a random access memory, or RAM), a primary storage 1904 (typically a read only memory, or ROM). CPU 1902 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors. As is well known in the art, primary storage 1904 acts to transfer data and instructions uni-directionally to the CPU and primary storage 1906 is used typically to transfer data and instructions in a bi-directional manner. The primary storage devices discussed previously may include any suitable computer-readable media such as those described above. A mass storage device 1908 may also be coupled bi-directionally to CPU 1902 and provides additional data storage capacity and may include any of the computer-readable media described above. Mass storage device 1908 may be used to store programs, data and the like and is typically a secondary storage medium such as a hard disk. It will be appreciated that the information retained within the mass storage device 1908, may, in appropriate cases, be incorporated in standard fashion as part of primary storage 1906 as virtual memory. A specific mass storage device such as a CD-ROM 1914 may also pass data uni-directionally to the CPU.

CPU 1902 may also be coupled to an interface 1910 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1902 optionally may be coupled to an external device such as a database or a computer or telecommunications or internet network using an external connection shown generally as a network 1912, which may be implemented as a hardwired or wireless communications link using suitable conventional technologies. With such a connection, the CPU might receive information from the network, or might output information to the network in the course of performing the method steps described in the teachings of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing a method, apparatus and program for using information derived from validated historical transaction matches to enable the matching of new transactions such that the operational risk associated with any potential mismatches is minimized according to the present invention will be apparent to those skilled in the art. Various aspects of the invention have been described above by way of illustration, and the specific embodiments disclosed are not intended to limit the invention to the particular forms disclosed. The particular implementation of a method, apparatus and program for using information derived from validated historical transaction matches to enable the matching of new transactions such that the operational risk associated with any potential mismatches is minimized may vary depending upon the particular context or application. By way of example, and not limitation, a method, apparatus and program for using information derived from validated historical transaction matches to enable the matching of new transactions such that the operational risk associated with any potential mismatches is minimized described in the foregoing were principally directed to the matching of financial business transaction records implementations; however, similar techniques may instead be applied to the matching of any form of operational transactions, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising:
  accessing, by one or more computer processing units, a database stored in memory of the one or more computer processing units, each entry of the database corresponding to one other entry of the database;
  collecting unmatched entries of the database into a first set, by the one or more computer processing units, the first set at least comprising database entries for which the corresponding one other entry is unidentified;
  calculating probabilities of event matches of unmatched entries originating from a single event, by the one or more computer processing units, said calculating comprising, for each entry identified in the first set of collected unmatched entries accessed by the one or more computing processing units from the database:
    calculating, by the one or more computer processing units, a probability of event matching for each other entry identified in the first set of collected unmatched entries, the probability of event matching identifying a likelihood that said entry and said other entry originated from the same event;
  for each calculated probability of event matching between pairs of entries identified in the first set of collected unmatched records, calculating a quality value for each of the event matches of the unmatched entries based on the calculated probability of matching for said pair of entries, by the one or more computer processing units;
  determining a second set of optimized event matches of the unmatched entries using at least the quality values, by the one or more computer processing units, each of the optimized event matches comprising entries deemed to have originated from the same event;
  modifying, by the one or more computer processing units, each entry in the database corresponding to the entries deemed to have originated from the event to include an identifier for a second entry deemed to have originated from the event; and
  storing, by the one or more computer processing units, each modified entry to the memory of the one or more computer processing units.

2. The method as recited in claim 1, in which said step of determining a second set maximizes an overall value of the quality values for the second set and every entry has only one event match.

3. The method as recited in claim 2, in which the quality value is further at least in part determined by a user defined quality function characterizing an operational cost associated with an event match being incorrect.

4. The method as recited in claim 1, in which said step of calculating probabilities uses the defined features and probability distributions to determine field range values of an entry where a defined percentage of possible candidate tuples are identified.

5. The method as recited in claim 2, in which a maximum match optimization for a bipartite graph is used.

6. The method as recited in claim 1, in which said step of accessing further comprises accessing additional entries which have not yet been processed.

7. The method as recited in claim 1, in which said step of calculating probabilities of event matches uses a supervised machine learning classifier which has been trained on historical matches which have been validated.

8. The method as recited in claim 7, in which event matches corresponding to historical matches which have been validated are determined as existing event matches following completion of a period of time for operational review.

9. The method as recited in claim 7, in which the supervised machine learning classifier comprises a non-parametric bayes classifier.

10. The method as recited in claim 8, in which the defined features and stored probability distributions are stored as histograms.

11. The method as recited in claim 1, in which a causal pair probability is calculated from a marginal probability of each causal pair over an entire match set joint probability.

12. The method as recited in claim 1, in which the defined features and stored probability distributions comprise histograms indexed by key causal characteristics.

13. The method as recited in claim 5, in which the bipartite graph comprises a set of separate bipartite graphs, each of the separate bipartite graphs comprising a closed set of entries and events which are potentially causally related.

14. The method as recited in claim 12, in which the defined features and stored probability distributions further comprise historical weighting factors.

15. The method as recited in claim 1, in which optimized event matches having a quality value below a defined threshold are marked for review.

16. The method as recited in claim 1, in which the calculated probability for each event match is displayed in a user interface.

17. A system comprising:
a computing device comprising one or more processing units and a memory storage device storing a database comprising a plurality of unmatched entries, each comprising data generated responsive to an event and corresponding to one other unmatched entry, the one or more processing units configured to:
retrieve, from the database, stored in the memory storage device of the computing device, the plurality of unmatched entries;
calculate, for each entry of the plurality of retrieved unmatched entries, a probability of event matching for each other entry of the plurality of retrieved unmatched entries, the probability of event matching identifying a likelihood that said entry and said other entry originated from the same event
store in a data structure in the memory storage device, for each entry of the plurality of retrieved unmatched entries, the calculated probabilities of event matching for each other entry of the plurality of retrieved unmatched entries;
calculate, for each calculated probability of event matching stored in the data structure, a quality value of the probability of event matching, each quality value based on the calculated probability of matching for said pair of entries;
store each calculated quality value in the memory storage device in association with the corresponding probability of event matching and corresponding pair of transactions entries of the plurality of retrieved unmatched entries;
generate a set of optimized matches of entries generated responsive to the same event, based on the calculated quality values for each pair of entries of the plurality of retrieved unmatched entries;
modify each entry in the database corresponding to the entries deemed to have been generated by the event to include an identifier for a second entry deemed to have been generated by the event; and
store each modified entry to the memory storage device of the computer processing device.

18. A non-transitory computer-readable storage medium with an executable program stored thereon, wherein the program instructs one or more processors to perform the following steps:
accessing a database, each entry of the database corresponding to one other record of the database;
collecting unmatched entries into a first set, the first set at least comprising entries for which the corresponding one other entry is unidentified;
calculating probabilities of event matches of entries originating from an event, said calculating comprising, for each entry identified in the first set of collected unmatched entries:
calculating a probability of event matching for each other entry identified in the first set of collected unmatched entries, the probability of event matching identifying a likelihood that said entry and said other entry originated from the same event;
calculating a quality value for each of the event matches of the unmatched entries based on the calculated probability of matching for said pair of entries;
determining a second set of optimized event matches using at least the quality values, each of the optimized event matches at least comprising entries deemed to have been generated by the event;
modifying each entry in the database corresponding to the entries deemed to have been generated by the event to include an identifier for a second entry deemed to have been generated by the event; and
storing each modified record to a memory storage device comprising the database.

19. The program instructing the processor as recited in claim 18, in which said step of determining a second set maximizes an overall value of the quality values for the second set and every entry is contained in only one event match.

20. The program instructing the processor as recited in claim 19, in which the quality value is further at least in part determined by a user defined quality function characterizing an operational cost associated with an event match being incorrect.

21. The program instructing the processor as recited in claim 18, in which said step of calculating probabilities uses the defined features and probability distributions to determine field range values of an entry where a defined percentage of possible candidate tuples are identified.

22. The program instructing the processor as recited in claim 19, in which a maximum match optimization for a bipartite graph is used.

23. The program instructing the processor as recited in claim 18, in which said step of accessing further comprises new entries which have not yet been processed.

24. The program instructing the processor as recited in claim 18, in which said step of calculating probabilities of event matches uses a supervised machine learning classifier which has been trained on historical matches which have been validated.

25. The program instructing the processor as recited in claim 24, in which event matches corresponding to historical matches which have been validated are determined as existing event matches following completion of a period of time for operational review.

26. The program instructing the processor as recited in claim 24, in which the supervised machine learning classifier comprises a non-parametric bayes classifier.

27. The program instructing the processor as recited in claim 25, in which the defined features and stored probability distributions are stored as histograms.

28. The program instructing the processor as recited in claim 18, in which a causal pair probability is calculated from a marginal probability of each causal pair over an entire match set joint probability.

29. The program instructing the processor as recited in claim 18, in which the defined features and stored probability distributions comprise histograms indexed by key causal characteristics.

30. The program instructing the processor as recited in claim 22, in which the bipartite graph comprises a set of separate bipartite graphs, each of the separate bipartite graphs comprising a closed set of entries and events which are potentially causally related.

31. The method of claim 1, wherein calculating the quality value for each of the event matches further comprises:

for each calculated probability of event matching between pairs of entries identified in the first set of collected unmatched records, calculating the quality value of the calculated probability based on (i) the calculated probabilities of matching for said pair of entries, (ii) the calculated probabilities of matching for a first entry of said pair of entries with each other entry identified in the first set, and (iii) the calculated probabilities of matching for a second entry of said pair of entries with each other entry identified in the first set.

32. The method of claim 1, wherein each entry may be correctly paired with only one other entry, and wherein the calculated quality value represents the probability of matching of said pair of entries being correct in the context of conflicting other possible event matches for a first entry of said pair and other conflicting other possible event matches for a second entry of said pair.

* * * * *